April 14, 1925.
O. A. COLBY
1,533,225
TEMPERATURE REGULATOR
Filed June 10, 1922
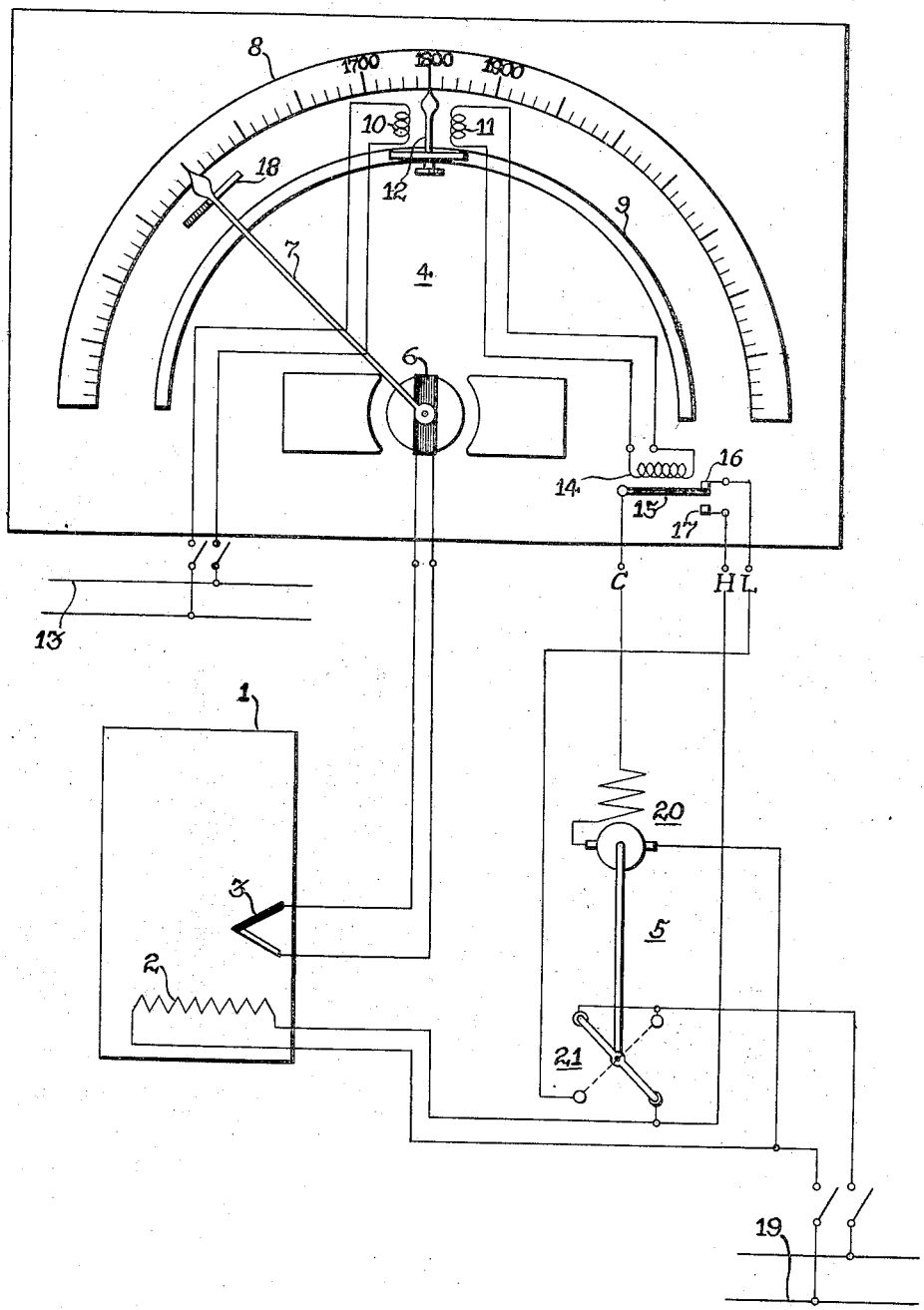
WITNESSES:
INVENTOR
Ora A. Colby.
BY
ATTORNEY Patented Apr. 14, 1925.

1,533,225

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

TEMPERATURE REGULATOR.

Application filed June 10, 1922. Serial No. 567,445.

*To all whom it may concern:*

Be it known that I, ORA A. COLBY, a citizen of the United States, and a resident of Irwin, in the county of Westmoreland and State of Pennsylvania, have invented a new and useful Improvement in Temperature Regulators, of which the following is a specification.

My invention relates to temperature control apparatus and particularly to temperature-indicating apparatus which may be easily and economically modified to serve also to control the temperature of the device with which it is associated.

One object of my invention is to provide an inexpensive control attachment that may be applied to a temperature-indicating apparatus to co-operate therewith to control the temperature of a furnace, or the like, with which the indicator is associated, by controlling the energy input of the furnace.

Another object of my invention is to provide a device, of the above-indicated character, that may be applied to the present operating indicating instruments without involving a considerable change in the structure thereof, to permit the indicating instrument to serve also as a controlling device.

A further object of my invention is to provide a device, of the above-indicated character, that shall permit of free movement of the indicating member throughout the complete range thereof, and that shall be inductively controlled by the indicating member only when that member enters a predetermined zone of the plane traversed thereby corresponding to a predetermined range of temperature within which the temperature of the furnace is to be maintained.

In co-pending application, Serial No. 555,514, filed April 18, 1922, by Thomas A. Reid, and assigned to the Westinghouse Electric & Manufacturing Company, is disclosed a temperature indicating and control device wherein the indicating instrument is provided with a contactive device which is periodically operated. The contactive device is adjustable to any desired position relative to the scale of the instrument, and is adapted to co-operate with the indicating member to effect the control of the temperature of the furnace when the indicating member enters or moves within a zone of the path traversed by it corresponding to the position of the contactive device.

In the arrangement disclosed in the co-pending application, the contactive device operates periodically, irrespective of the position of the indicating member, but co-operates with the indicating element only when that element enters a predetermined zone, as mentioned above.

In practicing my invention, I provide a contactive device that is inductively controlled by the indicating member and caused to operate only when that member is within a zone of its path corresponding to the range of temperature within which the temperature of the furnace is to be maintained. The device embodying my invention comprises two mutually inductive coils movable relative to the scale of the instrument to any predetermined position relative thereto. One coil is constantly energized. The other coil is connected to a heating element that is associated with a thermally-responsive member. That member normally is adapted to operate at ordinary temperatures to engage one contact member, when relatively cool, and to engage another contact member when heated to, or beyond, a predetermined degree.

Normally, the energized coil has but little influence on the coil that is connected to the heating element because of the reluctance of the path for the developed magnetic flux. However, when the indicating member is moved into the zone corresponding to the position of the coils, a magnetizable member, that is controlled thereby, is moved into the path of the flux between the two windings and serves so to reduce the reluctance of such path that the two coils and the magnetizable member constitute a transformer.

The heating element that is associated with the thermal-responsive device is thereupon sufficiently energized from the secondary coil to heat the thermal-responsive device to effect the actuation thereof. The operation of the thermal-responsive device between the two contact members serves to control an external control circuit whereby the admission of energy to the furnace may be controlled.

The figure of the accompanying drawing is a diagrammatic view of an electrical circuit, containing a temperature indicating and control instrument embodying my invention.

The system shown in the figure comprises, in general, a furnace 1 that is provided with a heating element 2 and a thermocouple 3 that is subjected to the temperature of the furnace to energize an indicating and control instrument 4 in accordance with such temperature. In addition, a motor-operated snap switch 5 is provided to control the admission of energy to the heating element 2. The motor-operated snap switch is controlled by the indicating and control instrument 4.

The instrument 4 comprises a movable coil 6 that actuates an indicating member or pointer 7 in accordance with the degree of energization of the coil 6, and may be of the d'Arsonval type. The pointer 7 co-operates with a stationary scale 8 that is properly calibrated to indicate thereon the temperature of the thermocouple 3.

Adjacent to the scale 8 is disposed a supporting member 9 of arc shape concentric with the arc of the scale. Disposed on the supporting member 9 are two coils 10 and 11 which may be moved to any position along the supporting member 9 according to the value at which the temperature of the furnace is to be maintained. The coils are provided with a pointer 12 that indicates, on the scale, the average value at which it is desired to maintain the temperature of the furnace.

The coil 10, constituting the primary coil, is constantly energized from a circuit 13 and the coil 11, constituting the secondary coil, is connected to a heating element 14 of a thermally-operable switch comprising a bimetallic member 15 and two contact members 16 and 17. Normally, the reluctance of the air path between the windings 10 and 11 is so great that very little transformer action is effected therebetween. As soon as the indicating member 7, however, enters the zone adjacent the position of the coils 10 and 11, a magnetizable member 18, that is disposed on, and supported by, the indicating member 7 serves so to decrease the reluctance of the magentic path between the two windings as to permit a relatively effective transformer action therebetween thereby energizing the heating element 14. Upon the energization of the heating element 14, the bimetallic member 15 is heated and caused to engage the contact member 17. A circuit is thereupon completed from an energizing source of energy 19 through a motor 20, the bimetallic member 15, the contact member 17 and a switch 21 back to the source of energy 19.

The motor is thereupon energized to actuate the switch 21 to its other position, shown in the broken line, thereby opening the circuit of the heating element 2 and also opening the circuit including the bimetallic element 15 and the contact member 17 to prevent pitting of the contactive surfaces of the element 15 and the contact member 17.

As the temperature of the furnace now decreases, the indicating member 7 gradually moves out of the zone of influence of the magnetizable member 18, and the heating of the element 14 is correspondingly decreased and the bimetallic member 15 permitted to re-engage the contact member 16. Upon such engagement, a circuit is again completed to energize the motor from the source of energy 19 through the motor, the bimetallic element 15, the contact member 16 and the switch 21, as shown in the broken line position. The motor 20 thereupon actuates the switch 21 to the position illustrated in the drawing to reconnect the heating element 2 to the circuit 19. The temperature of the furnace 1 is now again increased until the indicating member 7 moves the magnetizable member 18 within the zone adjacent the coils 10 and 11, whereupon the previously described operation is again effected to disconnect the energization of the heating element 2 from its energizing circuit.

The coils 10 and 11 are so disposed relative to the indicating member 7 that the indicating member may move freely through its complete range of movement. The necessity for the development of additional torque in the operating coil of the instrument to maintain effective engagement between the indicating member and a contact member that may be disposed in the path traversed by the indicating member is thus obviated.

Although I have shown a control element or relay device as a thermally-operated switch, it is, of course, obvious that an electromagnet switch may equally well be employed.

My invention, therefore, consists in the application of a device that normally operates as a very inefficient transformer but is so controlled by the indicating instrument, when the temperature of the furnace controlled thereby enters a predetermined range of temperature, as to be rendered sufficiently operative as a transformer to effect the operation of a control or auxiliary relay device.

My invention is therefore not limited to the specific elements that are illustrated or to the specific arrangement thereof, but may be variously modified without departing from the spirit and scope thereof as set forth in the appended claims.

I claim as my invention:

1. In a temperature-regulating system, the combination with a measuring instrument provided with an indicating member actuated in accordance with an external temperature being measured, of a thermoelectric contactive device, energizing means therefor, and means controlled by the indicating member for controlling the energizing means.

2. In a temperature-regulating system, the combination with a measuring instrument provided with an indicating member actuated in accordance with an external temperature being measured, of a thermally-operable contactive device, means thermally associated therewith for effecting the operation thereof, a transforming device for energizing said thermally associated means and means controlled by the indicating member for controlling the transforming device.

3. In a temperature-regulating system, the combination with a measuring instrument provided with an indicating member actuated in accordance with an external temperature being measured, of a thermally-operable contactive device, means thermally associated therewith for effecting the operation thereof, a transforming device for energizing said thermally associated means and means for controlling the transforming device in accordance with the deflection of the indicating member.

4. In a temperature-regulating system, the combination with a measuring instrument provided with an indicating member actuated in accordance with an external temperature being measured, of a thermally-operable contactive device, means thermally associated therewith for effecting the operation thereof, and a transformer for energizing the thermally-associated means, the indicating member operating to control the transformer by controlling the reluctance of the magnetic circuit thereof.

5. A temperature indicating and controlling device comprising a movable indicating member, two coils magnetically related and means controlled by the indicating member for controlling the degree of such magnetic relation.

6. A temperature indicating and controlling device comprising a movable indicating member, a transformer comprising a plurality of windings and means for controlling the degree of magnetic relation between such windings in accordance with the deflection of the indicating member.

7. A temperature indicating and controlling device comprising a movable indicating member, two coils magnetically related, one of the coils being connected to a source of alternating-current energy, a thermally-operable switch and means connected to the second coil for effecting the actuation of the switch.

8. A temperature indicating and controlling device comprising a movable indicating member, two coils magnetically related, one of the coils being connected to a source of alternating-current energy, a thermally-operable switch and means connected to the second coil for effecting the actuation of the switch, and means controlled in accordance with the deflection of the indicating member for controlling the degree of magnetic relation between the two coils to control the energization of the switch-actuating means connected to the second coil.

9. A controlling device comprising a movable member, a switch, and means magnetically related and controlled in such magnetic relation by the movable member for effecting the operation of the switch.

10. A controlling device comprising two stationary windings, a member movable in accordance with an external condition to be regulated, means for connecting one winding to a source of energy, a switch energized from the other winding and adapted to be actuated when said winding is energized to a predetermined degree, and means controlled by the movable member for controlling the energization of the second winding from the first winding.

11. An indicating and controlling device comprising a movable indicating member freely movable throughout its range of travel, a magnetizable member movable with the movement of the indicating member, a plurality of magnetically related windings between which the magnetic relation is controlled by the movable magnetizable member, and means operable when the magnetic relation is varied to a predetermined relation.

12. An indicating and controlling device comprising a movable indicating member freely movable throughout its range of travel, a magnetizable member movable with the movement of the indicating member, a plurality of windings disposed adjacent the path of travel of the magnetizable member, means for connecting one winding to a source of energy and means controlled by another of said windings to be sufficiently energized therefrom to be actuated, when the magnetizable member is actuated to a predetermined position with relation to the windings.

13. The combination with an indicating instrument embodying a movable indicating member, of a switch device having a normal position and an operated position, and magnetic means directly co-operating with the movable member for controlling the actuation of the switch to its operated position when the indicating member attains a predetermined deflection within a predetermined portion of its range including said predetermined deflection.

14. The combination with an indicating instrument embodying a movable indicating member, of a switch device having a normal and an operated position, two coils adapted to be rendered mutually inductive upon the establishment of proper magnetic relations therebetween, one of the windings serving to control the actuation of the switch, and means for establishing predetermined proper magnetic relations between the coils when the indicating member is deflected to a predetermined range of its travel.

15. The combination with an indicating instrument embodying a movable indicating member, of a switch device having a normal and an operated position, two coils adapted to be rendered mutually inductive upon the establishment of proper magnetic relations therebetween, one of the windings serving to control the actuation of the switch, and means controlled by the indicating member for establishing such proper magnetic relations.

16. The combination with an indicating instrument embodying a movable indicating member, of a switch device having a normal and an operated position, two coils adapted to be rendered mutually inductive upon the establishment of proper magnetic relations therebetween, one of the windings serving to control the actuation of the switch, and means controlled in accordance with the deflection of the indicating member for controlling the magnetic relation between the two coils.

In testimony whereof, I have hereunto subscribed my name this 2nd day of June, 1922.

ORA A. COLBY.